3,269,982
ISOTHIOCYANATE USAGE
Robert N. Meals, Burnt Hills, N.Y., assignor to General Electric Company, a corporation of New York
No Drawing. Filed Dec. 20, 1963, Ser. No. 332,291
4 Claims. (Cl. 260—46.5)

This application relates to a new class of room temperature curable organopolysiloxanes. More particularly, this invention relates to organopolysiloxanes which are curable at room temperature upon exposure to atmospheric moisture to the solid, cured, elastic state.

The present invention is based on my discovery of a composition comprising an organo tri-isothiocyanatosilane having the formula:

(1) 　　　RSi(NCS)$_3$ and a liquid silanol chain-stopped diorganopolysiloxane having the formula:

(2) 　　　HO[(R')$_2$SiO]$_n$H where R and R' are members selected from the class consisting of monovalent hydrocarbon radicals, halogenated monovalent hydrocarbon radicals and cyanoalkyl radicals and $n$ has a value of at least 10, e.g., from 10 to 10,000 or more. The compositions comprising the organo tri-isocyanatosilane and the liquid silanol chain-stopped diorganopolysiloxane are prepared by merely mixing the two components together.

Illustrative of the radicals represented by R of Formula 1 and R' of Formula 2 are alkyl radicals, e.g., methyl, ethyl, propyl, butyl, octyl, octadecyl, etc. radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, etc. radicals; cycloaliphatic radicals, e.g., cyclohexyl, cycloheptyl, cyclohexenyl, etc. radicals; halogenated monovalent hydrocarbon radicals, e.g., chloromethyl, chlorophenyl, trifluoromethylpropyl, dibromophenyl, bromohexyl, bromocyclohexenyl, trifluoromethylphenyl, etc. radicals; cyanoalkyl radicals, e.g., cyanomethyl, beta-cyanoethyl, beta-cyanopropyl, gamma-cyanopropyl, omega-cyanobutyl, etc. radicals. Where either the silane of Formula 1 or the siloxane of Formula 2 contain a silicon-bonded cyanoalkyl group, it is preferred that the cyano group be attached to silicon through at least two carbon atoms. While the radicals represented by R and R' can be any of the many radicals specifically described above, as well as any of the broader group defined for such radicals, it is preferred that the radicals be either methyl or phenyl with the preferred specific radical for both the silane and siloxane being methyl.

The organo tri-isothiocyanatosilanes of Formula 1 are well known in the art, with a number of these materials being described, for example, in Patent 2,559,340, Bluestein. These compounds are prepared by reacting an alkali-metal isothiocyanate or a silver isothiocyanate with an appropriate organotrichlorosilane having the formula RSiCl$_3$, where R is as previously defined. In general, the reaction is effected by reacting three moles of the alkali-metal or silver isothiocyanate with one mole of the organotrichlorosilane in a suitable solvent such as benzene, hexane or toluene, and heating the reaction mixture at the reflux temperature of the reaction mixture. After refluxing for a time which can vary from several hours up to 24 hours, depending upon the particular material employed, the desired organo tri-isothiocyanatosilane of Formula 1 is isolated by fractional distillation.

The liquid silanol chain-stopped diorganopolysiloxanes employed in the practice of the present invention are also well known in the art and include diorganopolysiloxanes of Formula 2 which contain more than one type of R' group. For example, some of the R' groups can be methyl and others can be phenyl and/or beta-cyanoethyl. In any event, it is preferred that in any silanol chain-stopped diorganopolysiloxane employed in the practice of the present invention, at least 50% of the R groups be methyl groups. Also included within the silanol chain-stopped diorganopolysiloxanes of Formula 2 are copolymers containing more than one type of diorganosiloxane unit. For example, included within such materials are copolymers of dimethylsiloxane units and methylphenylsiloxane units, as well as copolymers of dimethylsiloxane units, diphenylsiloxane units and methylvinylsiloxane units. Likewise, it is possible that a mixture of several different silanol chain-stopped diorganopolysiloxanes within the scopes of Formula 2 can be employed. Furthermore, while the materials within the scope of Formula 2 have been described as diorganopolysiloxanes, it should be understood that such materials can contain minor amounts, e.g., up to about 1% of monoorganosiloxane units or triorganosiloxane units.

The liquid silanol chain-stopped diorganopolysiloxanes employed in the practice of the present invention vary from thin fluids up to viscous gums, depending upon the value of $n$ of Formula 2 and the nature of the particular organic groups attached to the silicon atom. Preferably, however, the silanol chain-stopped liquid diorganopolysiloxane is selected to have a viscosity in the range of from about 100 centipoise to 50,000 centipoise when measured at 25° C.

The room temperature curing silicone rubber compositions of the present invention are prepared by merely mixing, under substantially anhydrous conditions, the organo tri-isothiocyanatosilane of Formula 1 with the liquid silanol chain-stopped diorganopolysiloxane of Formula 2. Since the silane of Formula 1 will tend to hydrolyze upon contact with moisture, care should be exercised during its storage and during its addition to the silanol chain-stopped diorganopolysiloxane of Formula 2 to exclude moisture. Likewise, care should be taken to insure that the mixture of the silane of Formula 1 and the diorganopolysiloxane of Formula 2 is maintained under substantially anhydrous conditions if it is desired to store the mixture for an extended period of time prior to conversion of the mixture to the silicone rubber state. On the other hand, if it is desired to permit the mixture to cure immediately upon the addition of the silane to the diorganopolysiloxane, no special precautions need to be taken and the two materials are merely mixed and placed in the form or shape in which it is desired for the materials to cure.

Because the organo tri-isothiocyanatosilanes employed in preparing the compositions of the present invention are generally solid materials at room temperature, it is often desirable to exercise care to insure that the silane is uniformly dispersed or mixed in the liquid diorganopolysiloxane. This mixing or dispersion can be accomplished by several means. For example, the silanes can be dissolved in any suitable solvent, such as acetone, benzene, hexane or toluene, and the solution of the silane can then be mixed into the liquid diorganopolysiloxane. In general, the amount of solvent employed is the minimum amount sufficient to completely dissolve the organo tri-isothiocyanatosilane which, depending upon the particular solvent, can be in the range of from about ½ to 5 parts per part of the silane. Another satisfactory method for insuring uniform dispersion of the silane in the liquid diorganopolysiloxane is by heating the silane above its melting point and heating the liquid diorganopolysiloxane also above the melting point of the silane. At this temperature, mixing of the two components is relatively simple and after thorough mixing is obtained, the mixture is allowed to cool to room temperature. It is generally found that the organo tri-isothiocyanatosilanes are sufficiently soluble in the diorganopolysiloxane fluids that once uniform mixing has been effected, a true solution is formed so that no separation problems exist.

The amount of organo tri-isothiocyanatosilane added to the liquid silanol chain-stopped diorganopolysiloxane can vary within wide limits. However, for best results it is preferred to add at least 1.0 mole, e.g., from 1.1 to 2.0 moles of the silane of Formula 1 per mole of the liquid diorganopolysiloxane of Formula 2. Satisfactory curing can be obtained, however, when amounts of the silane of Formula 1 employed is as low as about 0.6 mole per mole of silanol groups in the diorganopolysiloxane. Suitable results are obtained when the reactants are present in the ratio of from about 0.6 to 5 moles of the silane of Formula 1 per mole of the diorganoplysilxane of Formula 2. No particular benefit is derived from employing more than about 5 moles of the silane per mole of the diorganopolysiloxane. The temperature of the addition of the silane of Formula 1 to the liquid diorganopolysiloxane of Formula 2 is immaterial except insofar as the use of elevated temperatures facilitate the uniform mixture of the two materials. Where elevated temperatures are employed, temperatures in the range of from about 20 to 90° C. have been satisfactory.

The compositions prepared by mixing the organo tri-isothiocyanatosilanes of Formula 1 with the fluid silanol chain-stopped diorganopolysiloxanes of Formula 2 can be used without further modification in many sealing, caulking or coating applications by merely placing the compositions in the desired place and permitting them to cure upon exposure to moisture present in the atmosphere. Upon exposure of such compositions to atmospheric moisture, even after storage for times as long as two years or more, a hard "skin" will form on the composition after 20 to 30 minutes and complete cure to the rubbery state will have been effected within 24 hours, all at room temperature.

It is often desirable to modify the compositions of the present invention by the incorporation of various fillers or extenders to change various properties such as color or cost. Illustrative of the many fillers which can be employed with the compositions of the present invention are titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed quartz, calcined clays, asbestos, carbon and graphite, as well as other organic materials such as cork, cotton and synthetic fibers. When fillers are added to the compositions of the present invention, they are generally employed in amounts of from about 20 to 200 parts filler per 100 parts of the liquid silanol chain-stopped diorganopolysiloxane of Formula 2. Because the compositions of the present invention have a bright yellow color imparted by the isothiocyanate, additional coloring agents are not generally employed. However, it is sometimes desirable to add other coloring agents to modify the final color of the cured compositions.

Where fillers or other additives are employed in the compositions of the present invention, these materials are added at any stage in the preparation of such compositions. Specifically, the fillers, the liquid silanol chain-stopped diorganopolysiloxanes of Formula 2 and the organo tri-isothiocyanatosilanes of Formula 1 can be added in any order, with adequate protection maintained to keep the entire reaction mixture substantially anhydrous when it is desired to store the resulting mixture for an extended period of time prior to use. The presence of the fillers in the compositions of the present invention has no significant effect on the curing characteristics of such compositions, with initial skinning still occurring within about one-half hour at room temperature and complete cure usually being obtained within about 24 hours at room temperature.

The room temperature curing silicone rubber compositions of the present invention are particularly adapted for caulking and sealing applications where adhesion to various surfaces is important. For example, the materials are useful in household caulking applications and industrial applications such as on buildings, factories, automotive equipment and where adhesion to masonry, glass, plastic, metal and wood is required.

The following examples are illustrative of the practice of my invention and are not intended for purposes of limitation. All parts are by weight.

*Example 1*

To a reaction vessel was charged 4 parts of methyl tri-isothiocyanatosilane having the formula:

(3) 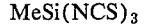

and 100 parts of a silanol chain-stopped dimethylpolysiloxane having a viscosity of about 3,000 centipoise at 25° C. The reaction mixture was heated to a temperature of 75° C., which was above the 70 to 71° C. melting point of the silane. The reaction mixture was maintained at this temperature with stirring for 5 minutes to assure uniform dispersion of the silane and the reaction mixture was allowed to cool to room temperature. A portion of the reaction mixture was poured into an aluminum cup to a depth of 0.1 inch. Within 25 minutes, a firm skin had formed and within 24 hours the material in the cup was completely and uniformly cured to a tough, elastic silicone rubber, which was bright yellow in color. When an attempt was made to strip the cured rubber from the aluminum cup at the end of this time, rupture occurred in the body of the rubber rather than at the interface between the rubber and the aluminum cup, indicating good adhesion between the rubber and the aluminum surface. After 30 days storage, a second sample of the mixture described above was mixed with fumed silica in the ratio of 10 parts of the mixture and 1 part of silica. The resulting yellow paste was spread upon the surface of the aluminum plate to a depth of about 0.1 inch and by the end of 24 hours, the material on the strip had cured to a tough silicone rubber which could not be stripped from the aluminum plate without rupturing the silicone rubber itself.

*Example 2*

Phenyl tri-isothiocyanatosilane is prepared by slowly adding 110 parts of phenyltrichlorosilane to a mixture of 270 parts of sodium isothiocyanate in 250 parts benzene. The reaction mixture is then refluxed for 16 hours and fractionally distilled to produce phenyl tri-isothiocyanatosilane which melts at about 52° C. One hundred parts of a silanol chain-stopped copolymer containing 3 mole percent diphenylsiloxane units and 97 mole percent dimethylsiloxane units and having a viscosity of 10,000 centipoise at 25° C. was heated to a temperature of 65° C. To this heated fluid was added 5 parts of the phenyl tri-isothiocyanatosilane and the reaction mixture was cooled to room temperature. A portion of the resulting mixture was poured into an aluminum cup to a depth of 0.1 inch and cured to a hard yellow silicone rubber within 24 hours.

The ability of the compositions of the present invention to cure to the solid, elastic state upon exposure to atmospheric moisture is completely unexepcted in view of the fact that when a mixture is prepared by the procedure of Example 1, from 100 parts of the silanol chain-stopped dimethylpolysiloxane of that example and 4 parts of methyl tri-isocyanatosilane, the resulting material does not cure to a silicone rubber, even after exposure to atmospheric moisture for 72 hours.

While the foregoing examples have illustrated several of the embodiments of my invention, it should be understood that my invention is directed broadly to compositions comprising a silanol chain-stopped diorganopolysiloxane of the type shown with respect to Formula 2 with the organo tri-isothiocyanatosilanes of Formula 1 and to the process of preparing such compositions by mixing the two components together.

What I claim as new and desire to secure by Letters Patent of the United States is:

1. A composition protected from moisture and curable upon exposure to atmospheric moisture to the solid, elastic state consisting essentially of a liquid silanol chain-stopped diorganopolysiloxane having a viscosity of from about 100 centipoise to 50,000 centipoise when measured at 25° C. and an organo tri-isothiocyanatosilane, the organo groups of both said diorganopolysiloxane and said silane being members selected from the class consisting of monovalent hydrocarbon radicals, halogenated monovalent hydrocarbon radicals and cyanoalkyl radicals.

2. A composition of claim 1 in which said organic tri-isothiocyanatosilane is present in an amount equal to from about 0.6 to 5 moles per mole of said diorganopolysiloxane.

3. A composition protected from moisture and convertible to the solid, cured, elastic state upon exposure to atmospheric moisture consisting essentially of a liquid silanol chain-stopped dimethylpolysiloxane having a viscosity of from about 100 to 50,000 centipoise at 25° C. and methyl tri-isothiocyanatosilane.

4. The process of forming a composition convertible to the solid, cured, elastic state which comprises mixing, under substantially anhydrous conditions, a liquid silanol chain-stopped diorganopolysiloxane having a viscosity of about 100 to 50,000 centipoise at 25° C. and an organo tri-isothiocyanatosilane where the organo groups of said organopolysiloxane and said organo tri-isothiocyanatosilane are members selected from the class consisting of monovalent hydrocarbon radicals, halogenated monovalent hydrocarbon radicals and cyanoalkyl radicals.

References Cited by the Examiner

UNITED STATES PATENTS

| | | | |
|---|---|---|---|
| 2,511,310 | 6/1950 | Upson | 260—46.5 |
| 2,559,340 | 7/1951 | Bluestein | 260—46.5 |
| 2,893,898 | 7/1959 | Evans et al. | 260—46.5 |
| 2,932,586 | 4/1960 | Wilson et al. | 260—448.2 |
| 3,032,530 | 5/1962 | Falk | 260—46.5 |
| 3,035,016 | 5/1962 | Bruner | 260—46.5 |
| 3,170,891 | 2/1965 | Speier | 260—46.5 |

FOREIGN PATENTS 1,198,749  6/1959  France.

LEON J. BERCOVITZ, *Primary Examiner.*

M. I. MARQUIS, *Assistant Examiner.*